(12) United States Patent
Nigul et al.

(10) Patent No.: US 8,271,942 B2
(45) Date of Patent: Sep. 18, 2012

(54) DEFINING A SINGLE ANNOTATION MODEL

(75) Inventors: Leho Nigul, Richmond Hill (CA); Ivy Ho, Toronto (CA); Ernest W. Mah, Markham (CA); Wu Ning, Toronto (CA)

(73) Assignee: International Business Machines Corporation, Armonk, NY (US)

( * ) Notice: Subject to any disclaimer, the term of this patent is extended or adjusted under 35 U.S.C. 154(b) by 1170 days.

(21) Appl. No.: 12/115,588

(22) Filed: May 6, 2008

(65) Prior Publication Data

US 2009/0281982 A1  Nov. 12, 2009

(51) Int. Cl.
*G06F 9/44* (2006.01)
(52) U.S. Cl. .......................................... 717/108
(58) Field of Classification Search .................. None
See application file for complete search history.

(56) References Cited

U.S. PATENT DOCUMENTS

| | | | |
|---|---|---|---|
| 7,458,062 B2 * | 11/2008 | Coulthard et al. ............ | 717/121 |
| 7,565,364 B1 * | 7/2009 | Darcy et al. ............................ | 1/1 |
| 7,644,050 B2 * | 1/2010 | Berg et al. ........................ | 706/18 |
| 2007/0079299 A1 | 4/2007 | Daly | |
| 2007/0179962 A1 | 8/2007 | Hernandez-Sherrington et al. | |
| 2008/0077849 A1 * | 3/2008 | Adams et al. .................. | 715/230 |
| 2008/0222602 A1 | 9/2008 | Vaziri-Farahani et al. | |
| 2009/0037805 A1 * | 2/2009 | Theobald ....................... | 715/230 |

OTHER PUBLICATIONS

Rongfa Philip Wang, USPTO Office Action, U.S. Appl. No. 12/043,349, Notification Date Oct. 31, 2011, 9 pages.
Rongfa Philip Wang, USPTO Notice of Allowance and Fee(s) Due, U.S. Appl. No. 12/043,349, Date Mailed Feb. 21, 2012, 11 pages.

* cited by examiner

*Primary Examiner* — Philip Wang
(74) *Attorney, Agent, or Firm* — Hoffman Warnick LLC; Daniel McLoughlin

(57) ABSTRACT

The present invention defines a single Java annotation model. A method in accordance with an embodiment includes: receiving a Java annotation declaration in a Java annotation model; receiving a Java annotation definition in the Java annotation model; receiving domain specific context rules in the Java annotation model; and providing access to combined meta-data information derived from the Java annotation declaration, the Java annotation definition, and the domain specific context rules through the Java annotation model.

6 Claims, 3 Drawing Sheets

DEFINING A SINGLE ANNOTATION MODEL

CROSS-REFERENCE TO RELATED APPLICATIONS

The present application is related to copending and commonly-owned U.S. application Ser. No. 12/043,349, entitled "POPULATING INFORMATION CONTAINED IN JAVA ANNOTATIONS INTO EXISTING EMF MODELS", filed on Mar. 6, 2008, the entire contents of which are herein incorporated by reference.

FIELD OF THE INVENTION

The present invention relates to a Java Annotations. Specifically, the present invention relates to the aggregation and access of meta-data information that comes from multiple, different sources.

RELATED ART

Java annotations are used to represent meta-data directly in the Java source code (Java and all Java-based trademarks are trademarks of Sun Microsystems, Inc. in the United States, other countries, or both.) This meta-data often represents a certain domain model. Although Java annotations are specified in the Java source code, only part of the relevant meta-data information can be obtained directly from the annotation declaration in the source. Such relevant meta-data information delivered by Java annotations may come from multiple sources: (1) annotation declaration in the source code including: (a) explicit value of annotation attributes; and (b) location of the annotation within the source file; and (2) annotation implementation meta-data. This contains information with regard to: (a) names of all annotation attributes (including the ones that do not show up explicitly in the Java source); (b) Java element scope in which given annotation is relevant (type, method, field, etc); (c) Information about which annotation attributes are required; and (d) default values of the annotation attributes. A third source (3) of data is domain specific information that provides rules of interpretation based on the context in which the annotation appears and semantic information provided by the domain. These can: (a) determine implied values for Java annotation attributes depending on the location within Java source; and (b) determine implied annotations based on the existence of other Java annotations. Currently there is no single model which would aggregate all this information together and provide user with single point of access to all of this information

SUMMARY OF THE INVENTION

The present invention defines a single Java annotation model that allows users to access information that comes from Java annotation declaration, Java annotation implementation meta-data, and the context and semantic information specific to a particular domain. From the a developer's perspective, obtaining information from the single model through the well defined set of APIs (Application Program Interfaces), provides a significant advantage over existing ways of obtaining the same information (reading domain specifications to determine domain specific annotation behavior, introspecting the annotation definition types and parsing the code). This combined annotation model serves as a basis for implementing rich tooling which can provide users with the ability to visualize and manage information provided through Java annotations.

A first aspect of the present invention is directed to a method for providing access to meta-data information for Java annotations, comprising: receiving a Java annotation declaration in a Java annotation model; receiving a Java annotation definition in the Java annotation model; receiving domain specific context rules in the Java annotation model; and providing access to combined meta-data information derived from the Java annotation declaration, the Java annotation definition, and the domain specific context rules through the Java annotation model.

A second aspect of the present invention provides a system for providing access to meta-data information for Java annotations, comprising: a module for receiving a Java annotation declaration in a Java annotation model; a module for receiving a Java annotation definition in the Java annotation model; a module for receiving domain specific context rules in the Java annotation model; and a module for providing access to combined meta-data information derived from the Java annotation declaration, the Java annotation definition, and the domain specific context rules through the Java annotation model.

A third aspect of the present invention is directed to a computer readable medium containing a program product for providing access to meta-data information for Java annotations, the computer readable medium comprising program code for causing a computer system to: receive a Java annotation declaration in a Java annotation model; receive a Java annotation definition in the Java annotation model; receive domain specific context rules in the Java annotation model; and provide access to combined meta-data information derived from the Java annotation declaration, the Java annotation definition, and the domain specific context rules through the Java annotation model.

A fourth aspect of the present invention is directed to a method for deploying an application for providing access to meta-data information for Java annotations, comprising: providing a computer infrastructure being operable to: receive a Java annotation declaration in a Java annotation model; receive a Java annotation definition in the Java annotation model; receive domain specific context rules in the Java annotation model; and provide access to combined meta-data information derived from the Java annotation declaration, the Java annotation definition, and the domain specific context rules through the Java annotation model.

A fifth aspect of the present invention is directed to a method for providing access to meta-data information for Java annotations, comprising: a memory medium having instructions, a bus coupled to the memory medium, and a processor coupled to the bus that when executing the instructions causes the data processing system to receive a Java annotation declaration in a Java annotation model; receive a Java annotation definition in the Java annotation model; receive domain specific context rules in the Java annotation model; and provide access to combined meta-data information derived from the Java annotation declaration, the Java annotation definition, and the domain specific context rules through the Java annotation model.

BRIEF DESCRIPTION OF THE DRAWINGS

These and other features of this invention will be more readily understood from the following detailed description of the various aspects of the invention taken in conjunction with the accompanying drawings.

DETAILED DESCRIPTION OF THE INVENTION

The present invention defines a single Java annotation model that allows a user to access information that comes from a Java annotation declaration, Java annotation implementation meta-data, and the context and semantic information specific to a particular domain. From the a developer's perspective, obtaining information from the single model through the well defined set of APIs, provides a significant advantage over existing ways of obtaining the same information (reading domain specifications to determine domain specific annotation behavior, introspecting the annotation definition types and parsing the code). This combined annotation model serves as a basis for implementing rich tooling which can provide users with the ability to visualize and manage information provided through Java annotations.

Figure 1:
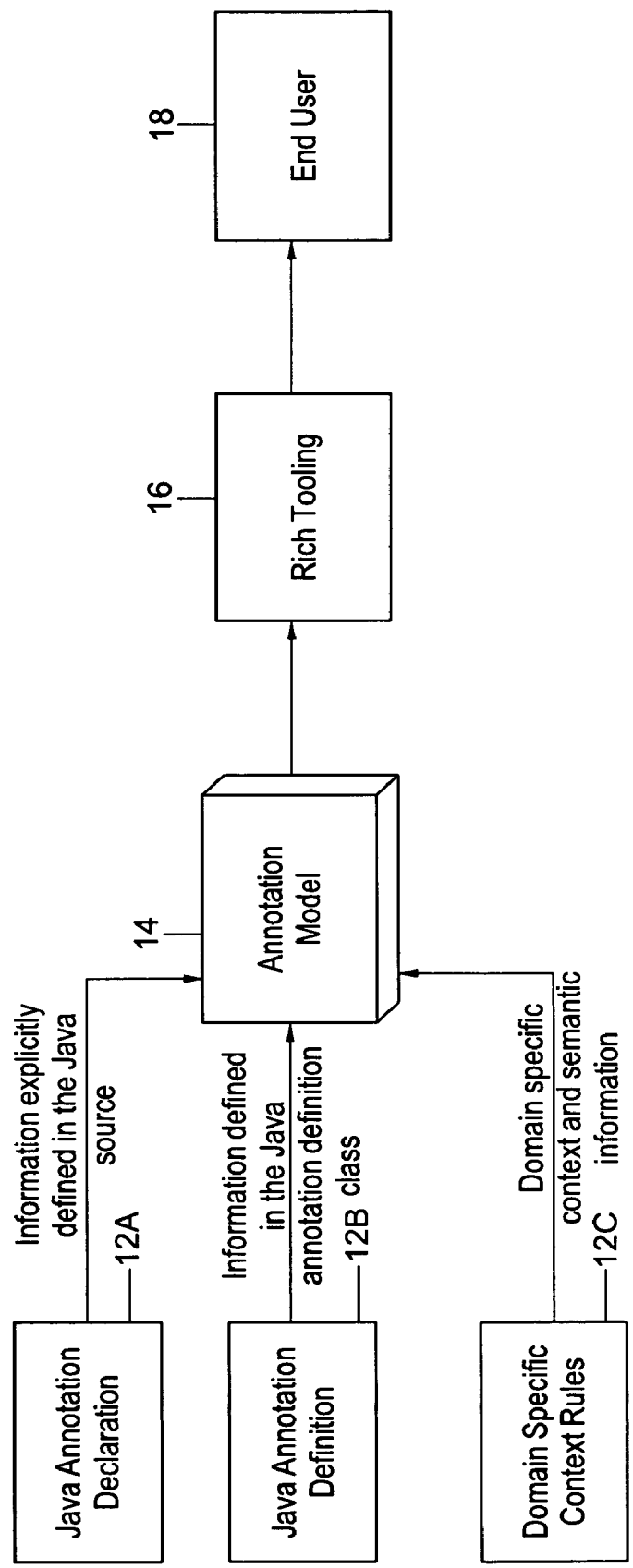
FIG. 1 depicts a high level block diagram according to the present invention.

Visually, the solution can be represented as shown in FIG. 1. As depicted, Java annotation declaration(s) 12A, Java annotation definition(s) 12B, and domain specific context rule(s) 12C (collectively referred to as "meta-data" information) are received, collected and/or aggregated by annotation model 14, which is developed and provided under the present invention as described below. This meta-data information can be viewed by an end user 18 using a set (at least one) of APIs for the annotation model 14. This solution can also implement a set of interfaces (e.g., graphical) that provide a rich environment for viewing and/or accessing the meta-data information. The provision of annotation model 14 and the various API calls that can be made will now be described in greater detail.

There are three major model artifacts that represent an annotation model 14: AnnotatedClassInfo object, which represents the set of annotations in the class; AnnotationInfo object, which provides a unified view of all the meta-data information for a given Java annotation, and AnnotationAttributeInfo, which provides information about specific annotation attribute. Each of these objects are described in greater detail below.

AnnotatedClassInfo

The AnnotatedClassInfo object represents the collection of annotations defined within a certain Java class. These annotations can be specified directly in the source, or implied to be a part of the class. An example of an implied annotation in the JPA domain, if @Entity annotation, is defined on the Java type level, it implies the @Column annotations on the private fields of this Java type.

The following API calls can be used to retrieve information defined directly in the Java source:

public List getAnnotations( ): This method returns the list of all the AnnotationInfo objects that correspond to annotations in the class.

public List getDeclaredAnnotations( ): This method returns the list of AnnotationInfo objects that correspond to the Java annotations declared in the Java code for given Java type API calls that retrieve information defined by specific domain rules.

public List getImpliedAnnotations( ): This method returns the list of AnnotationInfo objects that correspond to the implied Java annotations (Java annotations that are not actually present in the Java source code, but are implied to be there based on domain specific rules and depending on other Java annotations present in the code).

AnnotationInfo

The AnnotationInfo object contains information specific to certain Java annotation located at certain Java element. This information can be accessed through the following set of APIs, which retrieve information defined directly in the Java source:

public String getName( ): Returns fully qualified name of the Java annotation.

public List getDeclaredAttributes( ): Returns the list of AnnotationAttributeInfo objects which correspond to the annotation attributes that are explicitly defined in the source code.

public int getOffset( ): If source level information is available (model is derived from the Java source, as oppose to the binary class), this method returns the offset of the given Java annotation within the Java source file. If the source level information is not available, −1 is returned.

public JavaElementInfo getParentJavaElementInfo( ): Returns information about the Java element on which given Java annotation is defined.

API calls that retrieve information defined in the Java annotation definition:

public List getAllAttributes( ): Returns the list of AnnotationAttributeInfo objects which correspond to all attributes defined for the given Java annotations.

public List getScopes( ): Returns the list of java element scopes in which a given Java annotation is relevant (e.g., method scope, type scope, private member scope, etc).

API calls that retrieve information defined by specific domain rules:

public boolean isImpliedAnnotation( ): Returns true if given model object does not correspond to Java annotation explicitly defined in the Java source code, but is implied from the domain specific context rules based on other Java annotations defined in the source code.

Other APIs:

public AnnotationAttributeInfo getAttribute(String attributeName) Utility: Method that returns AnnotationAttributeInfo object that corresponds to the attribute with provided name. If no such attribute exists for given Java annotation, NULL is returned.

AnnotationAttributeInfo

The AnnotationAttributeInfo object contains information relevant to the particular Java annotation attribute, and includes several API calls.

API calls that retrieve information defined directly in the Java source:

public Object getValue( ): This method returns Object if the value of the attribute is explicitly defined in the code or null if this attribute was not explicitly defined in the Java source.

public boolean isDeclared( ): Returns true if the value of this attribute is explicitly defined in the source code.

public Annotation Info getParentAnnotation( ): Returns Annnotation Info object within which given annotation attribute object is defined.

API calls that retrieve information defined in the Java annotation definition:

public Object getDefaultValue( ): Returns Object if Java annotation implementation class defines some default value for this attribute. Returns null otherwise.

public Class getType( ): Returns Type of the attribute value (for example String.class).

public boolean isRequired( ): Returns true if corresponding Java annotation implementation class marks given attribute as required.

API calls that retrieve information defined by specific domain rules:

public Object getImpliedValue( ): This method returns Object if certain domain rules are defined with respect to the given attribute in context of the Java element on which corresponding annotation is defined, when no attribute is explicitly present in the source code (e.g., in EJB3 domain, if @Stateless annotation is defined on the type level of the Java class, and the attribute "name" of this annotation is not explicitly defined in the code, it is implied that the value of the "name" attribute is the name of the Java type). Returns NULL if no such rules have been defined.

Model APIs Implementation Details

This solution can be implemented in an Eclipse environment. Information from the three sources outlined above can be obtained by the model implementation by following means.

API calls that retrieve information defined directly in the Java source: This information can be retrieved by simple code parsing, or by using some existing development platform APIs. For example, an implementation of this set of APIs can be based on the Java annotations support provided by Eclipse JDT framework (starting from Eclipse 3.4). In particular by using IAnnotation and IMemberValuePair APIs provided by Eclipse Java Tools framework.

API calls that retrieve information defined in the Java annotation definition: Implementation of this set of APIs can be based on resolving the Java class that defines given Java annotation and obtaining corresponding data from the resolved class. The way a Java annotation definition class is resolved can be different, it can be some simple Java introspection call, or some call on the underlying development platform. For example, an Eclipse JDT framework can be used to implement that functionality underneath the covers.

API calls that retrieve information defined by specific domain rules: Context and semantic information provided by the domain is obtained through an extension point provided by the model. Developers using this model for a particular domain can implement an extension point that provides domain specific rules that calculate annotation meta-data information based on the context in which give annotation is used. A discussion of extension points and the information obtained using them follows.

Extension point for calculating implied value of the annotation attribute.

Domain owners implement this extension point by providing a callback class that can be called to calculate the implied value of the given annotation attribute in given Java element context. Each provided class extends the following abstract class:

```
public abstract class AnnotationAttributeValueRetriever
    { public Object getAttributeValue(AnnotationInfo info,
    String annotationAttrName, JavaElement javaElement)
        {
            return null;
        }
    }
```

As can be seen from this class, developers who define domain specific behavior by implementing this interface are provided with an AannotationInfo object which contains enough information to determine the domain specific context sensitive value for the particular Java annotation attribute.

The extension can be declared in the plugin.xml:

```
<extensionpoint="com.ibm.etools.annotations.core.-
AnnotationImpliedConfigAttributesInfo">
    <annotation tag="Stateful" package="javax.ejb" c
        ClassName="com.ibm.etools.annotations.ejb.internal.-
        StateMsgImplied">
        <attributes>
            <attribute name="name"/>
        </attributes>
    </annotation>
</extension>
```

In this example, EJB 3 domain owners provided class that can calculate the implied value of attribute "name" for @Stateful annotation. The information defined through these extensions is obtained from the model by calling public Object getImpliedValue( ) method on AnnotationAttributeInfo model object. In this method, the list of providers can be examined and see if some provider is registered to provide the implied value for the given annotation attribute in the given context. If such a provider exists, the corresponding call back class is invoked to calculate the implied value and return the result.

Extension point for obtaining the list of implied annotations.

Domain owners can implement this extension point by providing a callback class that can be called to determine if some Java annotation implies the presence of the other Java annotations in the source in accordance with domain specific rules. Each provided class extends the following abstract class defined in the framework:

```
public abstract class AnnotationImpliedAnnotationInfo {
    public ArrayList<String> getImpliedAnnotations(AnnotationInfo
anInfo, JavaElement je)
    {
        return null;
    }
}
```

As can be seen from this interface, developers who define domain specific behavior by implementing this interface are provided with annotation info object and Java element object for which context is wanted to get the list of implied annotations. The extension can be declared in the plugin.xml as shown in the following example:

```
<extensionpoint="com.ibm.etools.annotations.core.-
AnnotationConfigImpliedAnnotationsInfo">
    <impliedAnnotations tag="Entity" package="javax.persistence"
        className="com.ibm.etools.annotations.ejb.internal.-
        EntityImpliedAnnotation">
    </impliedAnnotations> </extension>
```

In this example JPA domain owners provide a class that returns the list of implied annotations for @Entity annotation The information defined through these extensions is obtained from the model by calling:

public List getImpliedAnnotations( ) method on AnnotatedClassInfo model object.

In this method, the list of providers that registered to provide the list of implied annotations for different Java elements is examined. After that, corresponding call back classes are invoked. If a non NULL value is returned, it is added to the result list. The returned list is of all implied annotations for all the Java elements in the given Java class Model Life-Cycle Initialization (1) The framework code determines if there are any annotated classes in a user's project and, if this is the case, an AnnotatedClassInfo object is created for each such class.

(2) For all the Java annotations defined in the given annotated class, the following is done:
  (A) Create an AnnotationInfo object to represent given annotation.
  (B) Resolve the Java annotation definition class and obtain required information from resolved class meta-data (in particular create AnnotationAttributeInfo objects for all attributes identified in the Java annotation definition class).
  (C) Parse the source code and obtain the information explicitly defined in the source.
  (D) Add created AnnotationInfo object to corresponding AnnotatedClassInfo object.

Access (1) All non implied information is retrieved directly from the model, because it is pre-populated at the initialization step.

(2) Implied attribute values and implied annotations are calculated on as-needed basis as described above.

Modification (1) The framework code listens to the Java source modification events and updates the model correspondingly; this makes sure that model provides correct information all the time.

Shut-Down (1) On shut down, the framework caches most important parts of the annotation model and after that the model is disposed.

Sample-Usage Scenarios for Annotation Model

Annotation View

Figure 2:
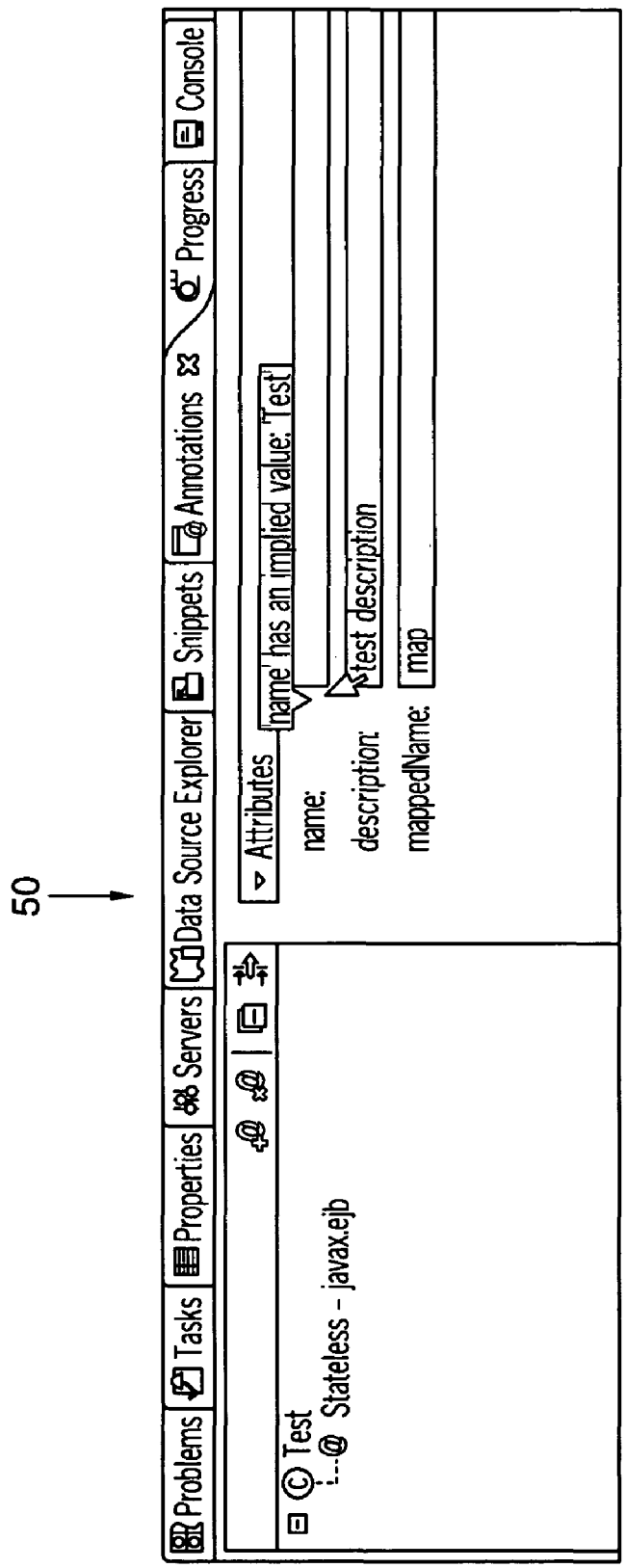
FIG. 2 depicts an example of rich tooling that can be provided using a single Java annotation model.

Under this solution, a rich Eclipse view 50 such as that shown in FIG. 2 can be provided to represent the annotation meta-data from all three sources. Such a view 50 can help users to easily visualize and manage information that comes from all three sources. This view is for EJB3 @Stateless annotation.

Programmatic Access

Tool developers and/or others can access the annotation model through programmatic interfaces and retrieve pieces of information that they are particularly interested in. This gives them great flexibility in obtaining Java annotation information that is particularly relevant to their specific tasks.

Developers using the annotation model do not need to know about the specifics of the information retrieval. They are able to use the well defined APIs on the model classes to get all the required information. This way of obtaining the meta-data defined by Java annotation is more simple, user friendly and efficient than existing means (such as code parsing, annotation definition class introspection and determining the domain specific behavior info from the domain specification docs) of obtaining the same information. Using unified annotation model also provides such benefits as:

(1) Pluggability and Extensibility: The created model is applicable to all Java annotations, and since all of the domain specific information is provided through the extension points, the Java annotation model can be extended and used to handle any domain specific interpretation of the Java annotations. The use of extensions also allows this design to be flexible with regard to changes within given domain. If any of the domain behaviors change (e.g., functionality redefined, removed, added) this doesn't affect the base annotation model, since only the extension point implementers will need to change their code. New extensions can be created to handle new specifications in the domain as an example.

(2) Base for rich tooling creation: Tools that are created on top of the annotation model can help users not only to understand the functionality related to a Java concept, but also the behaviors and functionalities specific to certain domains for which Java annotations are defined. The model is able to provide a big picture overview from the three sources as described above. This includes the visualization of Java annotation attribute implied values, implied annotations, and other domain specific concepts.

Figure 3:
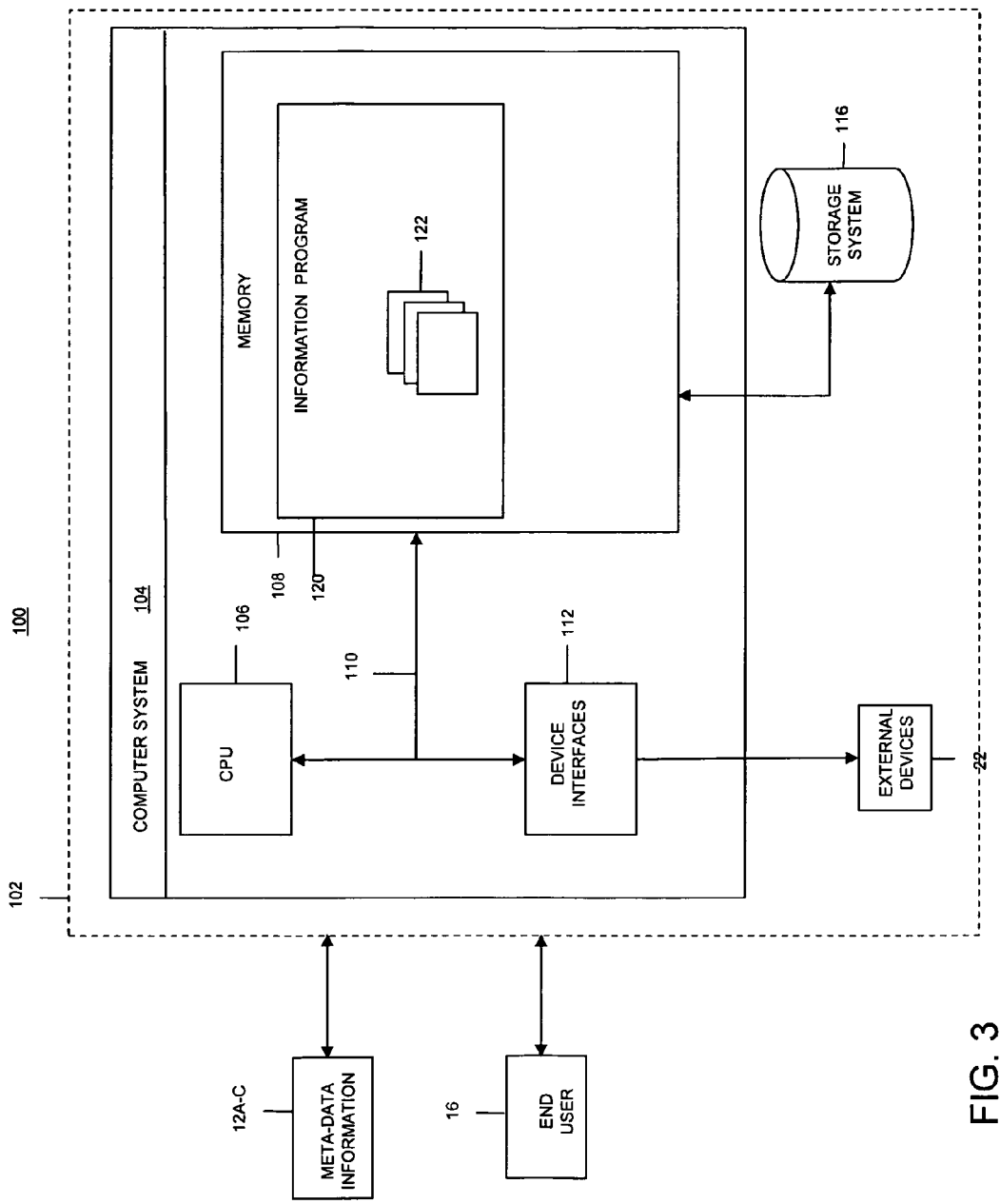
FIG. 3 depicts a more specific computerized implementation according to the present invention.

Referring now to FIG. 3, a computerized implementation 100 of the present invention is shown. As depicted, implementation 100 includes computer system 104 deployed within a computer infrastructure 102. This is intended to demonstrate, among other things, that the present invention could be implemented within a network environment (e.g., the Internet, a wide area network (WAN), a local area network (LAN), a virtual private network (VPN), etc.), or on a stand-alone computer system. In the case of the former, communication throughout the network can occur via any combination of various types of communications links. For example, the communication links can comprise addressable connections that may utilize any combination of wired and/or wireless transmission methods. Where communications occur via the Internet, connectivity could be provided by conventional TCP/IP sockets-based protocol, and an Internet service provider could be used to establish connectivity to the Internet. Still yet, computer infrastructure 102 is intended to demonstrate that some or all of the components of implementation 100 could be deployed, managed, serviced, etc. by a service provider who offers to implement, deploy, and/or perform the functions of the present invention for others. Although infrastructure depicts a single computer system 104, this need not be the case. For example the present invention can be implemented using more than one computer system either in and/or outside of computer infrastructure. For example, end user 16 could utilize computer system 104, a different computer system within infrastructure, and/or a computer system outside of infrastructure (not shown).

As shown, computer system 104 includes a processing unit 106, a memory 108, a bus 110, and device interfaces 112. Further, computer system 104 is shown having external devices 114 and storage system 116 that communicate with bus via device interfaces 112. In general, processing unit 106 executes computer program code, such as information program 120, having modules 122, stored in memory 108 and/or storage system 116. While executing computer program code, processing unit 106 can read and/or write data to/from memory 108, storage system 116, and/or device interfaces 112. Bus 110 provides a communication link between each of the components in computer system 104. Although not shown, computer system could also include I/O interfaces that communicate with: one or more external devices such as a kiosk, a checkout station, a keyboard, a pointing device, a display, etc.); one or more devices that enable a user to interact with computer system 104; and/or any devices (e.g., network card, modem, etc.) that enable computer system 104 to communicate with one or more other computing devices.

Computer infrastructure 102 is only illustrative of various types of computer infrastructures for implementing the invention. For example, in one embodiment, computer infrastructure 102 comprises two or more computing devices (e.g., a server cluster) that communicate over a network to perform the various process of the invention. Moreover, computer system 104 is only representative of various possible computer systems that can include numerous combinations of hardware. To this extent, in other embodiments, computer system 104 can comprise any specific purpose computing article of manufacture comprising hardware and/or computer program code for performing specific functions, any computing article of manufacture that comprises a combination of specific purpose and general purpose hardware/software, or the like. In each case, the program code and hardware can be created using standard programming and engineering techniques, respectively. Moreover, processing unit 106 may comprise a single processing unit, or be distributed across one or more processing units in one or more locations, e.g., on a client and server. Similarly, memory 108 and/or storage system 116 can comprise any combination of various types of data storage and/or transmission media that reside at one or more physical locations. Further, device interfaces 112 can comprise any module for exchanging information with one or more external devices. Still further, it is understood that one or more additional components (e.g., system software, math co-processing unit, etc.) not shown in FIG. 3 can be included in computer system 104.

Storage system 116 can be any type of system capable of providing storage for information under the present invention. To this extent, storage system 116 could include one or more storage devices, such as a magnetic disk drive or an optical disk drive. In another embodiment, storage system 116 includes data distributed across, for example, a local area network (LAN), wide area network (WAN) or a storage area network (SAN) (not shown). In addition, although not shown, additional components, such as cache memory, communication systems, system software, etc., may be incorporated into computer system 104.

Shown in memory 108 of computer system 104 is information program 120, which includes a set of modules 122. The module(s) 122 generally provide the functions of the present invention as described herein for receiving meta-data information 12A-C and providing access thereto via a set of APIs and rich tooling. It should be understood that information program 120 can actually comprise one or more programs that are integrated and/or or work in conjunction with one another. In any event, the set of modules 122 is configured to perform all functions described herein. While shown and described herein as an approach to provide access to meta-data information, it is understood that the invention further provides various alternative embodiments. For example, in one embodiment, the invention provides a computer-readable/useable medium that includes computer program code to enable a computer infrastructure to provide access to meta-data information. To this extent, the computer-readable/useable medium includes program code that implements each of the various process of the invention. It is understood that the terms computer-readable medium or computer useable medium comprises one or more of any type of physical embodiment of the program code. In particular, the computer-readable/useable medium can comprise program code embodied on one or more portable storage articles of manufacture (e.g., a compact disc, a magnetic disk, a tape, etc.), on one or more data storage portions of a computing device, such as memory 108 (FIG. 3) and/or storage system 116 (FIG. 3) (e.g., a fixed disk, a read-only memory, a random access memory, a cache memory, etc.), and/or as a data signal (e.g., a propagated signal) traveling over a network (e.g., during a wired/wireless electronic distribution of the program code).

In another embodiment, the invention provides a business method that performs the process of the invention on a subscription, advertising, and/or fee basis. That is, a service provider, such as a Solution Integrator, could offer to provide access to meta-data information. In this case, the service provider can create, maintain, support, etc., a computer infrastructure, such as computer infrastructure 102 (FIG. 3) that performs the process of the invention for one or more customers. In return, the service provider can receive payment from the customer(s) under a subscription and/or fee agreement and/or the service provider can receive payment from the sale of advertising content to one or more third parties.

In still another embodiment, the invention provides a computer-implemented method to provide access to meta-data information. In this case, a computer infrastructure, such as computer infrastructure 102 (FIG. 3), can be provided and one or more systems for performing the process of the invention can be obtained (e.g., created, purchased, used, modified, etc.) and deployed to the computer infrastructure. To this extent, the deployment of a system can comprise one or more of: (1) installing program code on a computing device, such as computer system 104 (FIG. 3), from a computer-readable medium; (2) adding one or more computing devices to the computer infrastructure; and (3) incorporating and/or modifying one or more existing systems of the computer infrastructure to enable the computer infrastructure to perform the process of the invention.

As used herein, it is understood that the terms "program code" and "computer program code" are synonymous and mean any expression, in any language, code or notation, of a set of instructions intended to cause a computing device having an information processing capability to perform a particular function either directly or after either or both of the following: (a) conversion to another language, code or notation; and/or (b) reproduction in a different material form. To this extent, program code can be embodied as one or more of: an application/software program, component software/a library of functions, an operating system, a basic device system/driver for a particular computing and/or device, and the like.

A data processing system suitable for storing and/or executing program code can be provided hereunder and can include at least one processor communicatively coupled, directly or indirectly, to memory element(s) through a system bus. The memory elements can include, but are not limited to, local memory employed during actual execution of the program code, bulk storage, and cache memories that provide temporary storage of at least some program code in order to reduce the number of times code must be retrieved from bulk storage during execution. Input/output or device devices (including, but not limited to, keyboards, displays, pointing devices, etc.) can be coupled to the system either directly or through intervening device controllers.

Network adapters also may be coupled to the system to enable the data processing system to become coupled to other data processing systems, remote printers, storage devices, and/or the like, through any combination of intervening private or public networks. Illustrative network adapters include, but are not limited to, modems, cable modems and Ethernet cards.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of the invention as defined by the accompanying claims.

We claim:

1. A method for providing access to meta-data information for Java annotations, comprising:
   receiving a Java annotation declaration in a Java annotation model, wherein the Java annotation model comprises a single model;
   receiving a Java annotation definition in the Java annotation model;
   receiving domain specific context rules in the Java annotation model; and
   providing access, using a set of application programming interfaces (APIs) on at least one computer system, to combined meta-data information derived from the Java annotation declaration, the Java annotation definition, and the domain specific context rules through the Java annotation model.

2. The method of claim 1, further comprising:
   implementing rich tooling to view the meta-data information.

3. A system for providing access to meta-data information for Java annotations, comprising:
   at least one computer system, including:
   a module for receiving a Java annotation declaration in a Java annotation model, wherein the Java annotation model comprises a single model;
   a module for receiving a Java annotation definition in the Java annotation model;
   a module for receiving domain specific context rules in the Java annotation model; and
   a module for providing access, using a set of application programming interfaces (APIs) on at least one computer system, to combined meta-data information derived from the Java annotation declaration, the Java annotation definition, and the domain specific context rules through the Java annotation model.

4. The system of claim 3, further comprising:
   a module implementing rich tooling to view the meta-data information.

5. A non-transitory computer readable medium containing a program product for providing access to meta-data information for Java annotations, the computer readable medium comprising program code for causing a computer system to:
   receive a Java annotation declaration in a Java annotation model, wherein the Java annotation model comprises a single model;
   receive a Java annotation definition in the Java annotation model;
   receive domain specific context rules in the Java annotation model; and
   provide access, using a set of application programming interfaces (APIs) on at least one computer system, to combined meta-data information derived from the Java annotation declaration, the Java annotation definition, and the domain specific context rules through the Java annotation model.

6. The computer readable medium of claim 5, further comprising program code for causing the computer system to implement rich tooling to view the meta-data information.

* * * * *